(12) United States Patent
Smith

(10) Patent No.: US 6,454,005 B1
(45) Date of Patent: Sep. 24, 2002

(54) TREATING SHALE AND CLAY IN HYDROCARBON PRODUCING FORMATIONS WITH COMBINATIONS OF GUAR AND POTASSIUM FORMATE

(75) Inventor: Kevin W. Smith, McMurray, PA (US)

(73) Assignee: Clearwater, Inc., Pittsburgh, PA (US)

( * ) Notice: Subject to any disclaimer, the term of this patent is extended or adjusted under 35 U.S.C. 154(b) by 0 days.

(21) Appl. No.: 09/803,501

(22) Filed: Mar. 9, 2001

(51) Int. Cl.[7] .......................... C09K 7/02; E21B 43/25; E21B 43/26
(52) U.S. Cl. .................... 166/294; 166/305.1; 166/308; 175/65; 175/72; 507/110; 507/115; 507/211; 507/216; 507/267
(58) Field of Search ................................ 166/271, 275, 166/294, 305.1, 308; 175/64, 65, 72; 507/103, 110, 115, 211, 216, 267, 922, 925

(56) References Cited

U.S. PATENT DOCUMENTS

| | | | |
|---|---|---|---|
| 4,366,071 A | | 12/1982 | McLaughlin et al. |
| 4,447,342 A | | 5/1984 | Borchardt et al. |
| 4,900,457 A | * | 2/1990 | Clarke-Sturman et al. .. 507/103 |
| 5,228,908 A | | 7/1993 | Burdick et al. |
| 5,514,644 A | | 5/1996 | Dobson |
| 5,607,902 A | | 3/1997 | Smith et al. ................. 507/120 |
| 5,635,458 A | * | 6/1997 | Lee et al. .................... 507/110 |
| 5,641,728 A | | 6/1997 | Dobson, Jr. et al. |
| 5,669,456 A | * | 9/1997 | Audibert et al. ............. 166/312 |
| 5,728,652 A | | 3/1998 | Dobson, Jr. et al. |
| 5,785,747 A | | 7/1998 | Vollmer et al. |
| 5,916,849 A | | 6/1999 | House |
| 5,962,375 A | * | 10/1999 | Sawdon et al. ............. 507/140 |
| 6,100,222 A | * | 8/2000 | Vollmer et al. ............. 507/103 |
| 6,124,244 A | * | 9/2000 | Murphey .................... 507/110 |

OTHER PUBLICATIONS

Ronald P. Steiger, "Fundamentals & Use of Potassium/Polymer Drilling Fluids to Minimize . . . Problems Associated w/ Hydratable Clays" Soc. Pet. Eng. 10100, 1982.

R.E. Himes & E.F. Vinson, "Environmentally Safe Salt Replacement for Fracturing Fluids" Soc. Pet. Eng. 23438, Oct. 1991.

* cited by examiner

Primary Examiner—George Suchfield
(74) Attorney, Agent, or Firm—William L. Krayer

(57) ABSTRACT

Clay is stabilized in the drilling of wells for hydrocarbon production by the addition to the drilling fluid of potassium formate together with an amount of guar effective to inhibit clay and shale swelling and sloughing.

10 Claims, No Drawings

TREATING SHALE AND CLAY IN HYDROCARBON PRODUCING FORMATIONS WITH COMBINATIONS OF GUAR AND POTASSIUM FORMATE

TECHNICAL FIELD

This application relates to the treatment of wells in the production of oil, gas and other fluids from underground formations, and particularly to the stabilization of boreholes drilled for the production of hydrocarbons, and the stabilization of the fractured subterranean formations after fracturing. It includes the treatment of shale and clay in situ to prevent swelling caused by the absorption of water from fluids used in the drilling, completion, fracturing, stimulation and workover of wells.

BACKGROUND OF THE INVENTION

Salts such as ammonium or potassium chloride are commonly used to make brines forced into wellbores to fracture hydrocarbon-containing subterranean formations. The fractures are propped open with various solid particulates, commonly carried into the fractures with the aid of viscosifying agents such as guar, guar derivatives, xanthans and other biopolymers or synthetic polymers. However, the inorganic salts sometimes are inimical to the presence of shale and clay in the formation, which may swell and slough on contact with the brine water.

A good description of the problem which this invention addresses in the context of formation drilling may be found in an article by Thomas W.

Beihoffer et al in the May 16, 1992 Oil & Gas Journal, page 47 et seq., entitled "Cationic Polymer Drilling Fluid Can Sometimes Replace Oil-based Mud." As stated therein, "(S)hales can become unstable when they react with water in the drilling fluid. These reactive shales contain clays that have been dehydrated over geologic time by overburden pressure. When the formation is exposed, the clays osmotically imbibe water from the drilling fluid. This leads to swelling of the shale, induced stresses, loss of mechanical strength, and shale failure." Shale crumbling into the borehole ("sloughing") can ultimately place a burden on the drill bit which makes it impossible to retrieve. Fractures in the formation can become blocked by swollen and displaced clay and shale.

Salts such as potassium chloride have been widely used in drilling treatments to convert the formation material from the sodium form by ion exchange to, for example, the potassium form which is less vulnerable to swelling; also the use of high concentrations of potassium salts affects the osmotic balance and tends to inhibit the flow of water away from the high potassium salt concentrations into the shale. However, it is difficult to maintain the required high concentrations of potassium salts in the drilling fluids. In addition, the physical introduction of such salts causes difficulties with the preparation of the viscosifying materials typically used for drilling. Inorganic salts can also have a harmful effect on the environment if released.

Guar has also been used, as well as various other water-soluble polymers, in the treatment of wellbores and the earth formations surrounding them, particularly for the control of swelling and sloughing of clay and shale, and to transport proppant materials in fracturing and similar operations. In many applications, however, the guar tends to degrade in higher temperatures frequently found in the formations, namely temperatures of 150–375° F. depending on the particular type of guar.

It would be desirable to assure that guar and guar derivatives will continue to perform acceptably at these higher temperatures.

SUMMARY OF THE INVENTION

The present invention includes the use of potassium formate together with guar for the treatment of clay and shale in subterranean formations during drilling and otherwise for the stabilization of clay and clay-containing shale. The combination of guar and potassium formate treatment extends the useful life of the guar in controlling swelling and sloughing of clay and shale in hydrocarbon recovery from the earth, and is particularly useful in formations having temperatures of 150–350° F.

DETAILED DESCRIPTION OF THE INVENTION

The invention includes a method of reducing permeability damage in a subterranean formation from contact of a treatment fluid with said subterranean formation comprising contacting the subterranean formation with an aqueous solution of the treatment fluid containing guar and potassium formate. In its most useful aspect, the combination of guar and potassium formate is used to treat a formation having temperatures from 100° F. to 375° F., preferably 150° F. to 350° F. although our combination of guar and potassium formate continues to be useful for shale stability above and below these ranges. Broadly, the guar will be present in the treatment fluid in concentrations from 1 to 100 pounds per thousand gallons (ppt) and the potassium formate will be present in concentrations of 0.5% to 50% by weight in the total solution. No more than 10% by weight inorganic salt will be present in the solution; preferably inorganic chlorides will be substantially absent. The solution may be introduced with the fracturing fluid or may follow after the fracturing of the formation, during the fracturing fluid breaking or removal phase, or during a stimulation treatment with acid or other treating fluids immediately following the fracturing or stimulation operation.

The guar may be any guar commonly used and known in the art, such as natural or synthetic guar, hydroxypropyl guar, and carboxymethyl hydroxypropyl guar. My use of the term "guar" includes these derivatives of guar. The potassium formate may be added as such, in solid or solution form, or may be formed in situ from separate additions of potassium hydroxide or potassium carbonate and formic acid, which can be added to the treating fluid on preparation, during mixing immediately before use, during the fluid's insertion into the wellbore, or while the treating fluid is in the wellbore. My use of the term potassium formate includes potassium formate made in situ in this manner and includes such potassium formate which is entirely in solution. The amounts of the potassium hydroxide or potassium carbonate and the formic acid should be such as to generate potassium formate in the amounts described above. It may be desirable to have an excess of either one of the reactants present after the reaction; the invention tolerates and includes such excesses.

Experiments have been performed to demonstrate the ability of potassium formate to preserve the viscosifying abilities of guar at elevated temperatures. Data in Table 1 was obtained by preparing the solutions described and generating the viscosity data at the temperatures indicated.

Each solution contained hydroxypropyl guar at a concentration of 40 pounds per thousand gallons solution. The last column represents the viscosity after the solutions were permitted to cool to room temperature. The term "gpt" means gallons of potassium formate solution per thousand gallons total solution; "71 g K" and "142 g K" mean 71 grams and 142 grams of (pure) potassium formate in the total solution prepared for the test, and equate to 10% and 20% by weight, respectively.

TABLE 1

Solution Viscosities -- Centipoise

| | Shear Rate, sec$^{-1}$ | Room Temp | 200° F. | 260° F. | 300° F. | Room Temp |
|---|---|---|---|---|---|---|
| 2% KCl | 40 | 2118.39 | 551 | 6 | — | 77 |
| 2% KCl | 100 | 1605.96 | 375 | 5 | — | 51 |
| 2% KCl | 170 | 1367.997 | 300 | 5 | — | 40 |
| 23 gpt | 40 | 1277.568 | 678.5429 | 37 | 8 | 868.0978 |
| 23 gpt | 100 | 861.2528 | 395.4821 | 34 | 7 | 594.8756 |
| 23 gpt | 170 | 685.4204 | 327.8947 | 33 | 7 | 477.9368 |
| 71 g K | 40 | 1489 | 650.5421 | 99.61733 | 8.158509 | 1440 |
| 71 g K | 100 | 1068 | 341.8956 | 91.45342 | 8.252954 | 946 |
| 71 g K | 170 | 881 | 271.8247 | 87.0352 | 8.308147 | 742 |
| 142 g K | 40 | 2055 | 712.4552 | 26.04415 | 10.42768 | 1484 |
| 142 g K | 100 | 1223 | 478.6582 | 24.97043 | 9.538304 | 990 |
| 142 g K | 170 | 906 | 323.5924 | 24.36899 | 9.058374 | 783 |

From the Table, it apparent that potassium formate inhibits the thermal degradation of guar. This can be seen not only in the results for higher temperatures with and without potassium formate, but also in the room temperature tests following the temperature treatment. The presence of the potassium formate prevents the molecular degradation of the guar polymer, so that on cooling the solutions to room temperatures after the heating process, the guar containing the potassium formate recovers its viscosity, whereas the guar containing potassium chloride does not.

What is claimed is:

1. Method of reducing permeability damage in a subterranean formation from contact of a treatment fluid with said subterranean formation comprising contacting the subterranean formation with an effective amount of an aqueous solution of said treatment fluid comprising guar and potassium formate, wherein said potassium formate is generated in situ.

2. Method of claim 1 wherein said potassium formate is present in said aqueous solution in a concentration of 0.5% to 50% by weight of said solution.

3. Method of claim 1 wherein said subterranean formation is at a temperature of 100° F. to 375° F.

4. Method of claim 3 wherein said subterranean formation is at a temperature of 150–350° F.

5. Method of inhibiting permeability damage in a subterranean formation at a temperature within 100–375° F., said permeability damage caused by contact of a treatment fluid with said subterranean formation, comprising contacting the subterranean formation with a treatment fluid comprising an aqueous solution comprising (a) hydroxypropyl guar or carboxymethyl hydroxypropyl guar and (b) potassium formate in amounts effective to inhibit said permeability damage.

6. Method of claim 5 wherein said guar is present in said solution in an amount from 1 to 100 pounds of guar per 1000 gallons of solution.

7. Method of claim 5 wherein said potassium formate is present in said solution in a concentration from 0.5% to 50% by weight of said solution.

8. An aqueous well drilling fluid comprising (a) hydroxypropyl guar or carboxymethyl hydroxypropyl guar and (b) potassium formate wherein said guar is present in said fluid in an amount from 1 to 100 pounds of guar per 1000 gallons of fluid and said potassium formate is present in said fluid in a concentration from 0.5% to 50% by weight of said fluid.

9. Method of claim 5 wherein said subterranean temperature is within 150–350° F.

10. Method of claim 6 wherein said potassium formate is present in said solution in a concentration of from 0.5% to 50% by weight of said solution.

\* \* \* \* \*